United States Patent
Möller et al.

(10) Patent No.: US 12,170,890 B2
(45) Date of Patent: Dec. 17, 2024

(54) METHOD FOR THE RELEASE OF USE, AND FUNCTION RELEASE DEVICE

(71) Applicant: Astra Gesellschaft für Asset Management mbH & Co. KG, Barsinghausen (DE)

(72) Inventors: Stefan Möller, Ronnenberg (DE); Anatoli Stobbe, Barsinghausen (DE)

(73) Assignee: ASTRA GESELLSCHAFT FÜR ASSET MANAGEMENT MBH & CO. KG, Barsinghausen (DE)

( * ) Notice: Subject to any disclaimer, the term of this patent is extended or adjusted under 35 U.S.C. 154(b) by 232 days.

(21) Appl. No.: 17/470,525

(22) Filed: Sep. 9, 2021

(65) Prior Publication Data
US 2022/0086631 A1    Mar. 17, 2022

(30) Foreign Application Priority Data
Sep. 11, 2020 (DE) .................. 10 2020 123 756.1

(51) Int. Cl.
*H04W 12/03* (2021.01)
*H04W 12/0431* (2021.01)
(Continued)

(52) U.S. Cl.
CPC ....... *H04W 12/03* (2021.01); *H04W 12/0431* (2021.01); *H04W 12/61* (2021.01); *H04W 12/63* (2021.01); *H04W 12/72* (2021.01)

(58) Field of Classification Search
CPC . H04W 12/03; H04W 12/0431; H04W 12/61; H04W 12/63; H04W 12/72;
(Continued)

(56) References Cited

U.S. PATENT DOCUMENTS

| | | | | |
|---|---|---|---|---|
| 2002/0178385 A1* | 11/2002 | Dent | ..................... | H04L 9/3271 726/27 |
| 2004/0165729 A1* | 8/2004 | Bisson | .................. | H04L 9/3234 380/281 |

(Continued)

*Primary Examiner* — Khalid M Almaghayreh
(74) *Attorney, Agent, or Firm* — WC&F IP (57) ABSTRACT

A method is described for the release of use of functions of at least one local data receiving unit (1) for a user by means of a central data processing unit (7) and the at least one selected local data receiving unit (1). The local data receiving unit (1) is configured to receive an encrypted release dataset from a user and to release use if at least one security feature contained in the release dataset in each case matches a corresponding release criterion stored in the local data receiving unit (1). The method comprises the following steps:
a) generating a release dataset through encryption of at least one release criterion by the central data processing unit (7) with a release key known to the central data processing unit (7) and to the selected local data receiving unit (1) and with an individual security feature of the user known to the central data processing unit (7);
b) transmitting the encrypted release dataset from the central data processing unit (7) to the mobile terminal device (4);
c) transmitting the release dataset from the mobile terminal device (4) to the selected local data receiving unit (1) together with an individual security feature of the user;
d) decrypting the release dataset encrypted with the combination of the release key and the individual security feature in the selected local data receiving unit (1);
e) releasing the use of a function in the event of successful verification of the release criterion contained in the decrypted release dataset.

20 Claims, 4 Drawing Sheets

(51) Int. Cl.
*H04W 12/61* (2021.01)
*H04W 12/63* (2021.01)
*H04W 12/72* (2021.01)

(58) Field of Classification Search
CPC . H04L 2209/80; H04L 9/0866; H04L 9/3231; G07C 2209/08; G07C 9/00563; G07C 9/00571; G07C 9/25; G07C 9/27; G07C 9/22
See application file for complete search history.

(56) References Cited

U.S. PATENT DOCUMENTS

| | | | |
|---|---|---|---|
| 2017/0185761 A1* | 6/2017 | Stanwood | G06V 40/1365 |
| 2018/0354460 A1* | 12/2018 | Bartels | G07C 9/00896 |
| 2019/0009747 A1* | 1/2019 | Guo | B60R 25/04 |
| 2019/0080540 A1* | 3/2019 | Sim | B60R 25/24 |
| 2019/0143939 A1* | 5/2019 | Inami | H04L 9/0819 |
| | | | 340/5.25 |
| 2020/0288269 A1* | 9/2020 | Bartucci | H04W 4/023 |
| 2021/0070252 A1* | 3/2021 | Bartels | G07C 9/00182 |
| 2021/0162949 A1* | 6/2021 | Arakawa | B60R 25/24 |
| 2021/0216619 A1* | 7/2021 | Helferich | G07C 9/00571 |
| 2021/0237686 A1* | 8/2021 | Inami | G07B 15/00 |

* cited by examiner

METHOD FOR THE RELEASE OF USE, AND FUNCTION RELEASE DEVICE

The invention relates to a method for the release of use of functions of at least one local data receiving unit for a user by means of a central data processing unit and the at least one selected local data receiving unit, wherein the local data receiving unit is configured to receive an encrypted release dataset from a user and to release use if at least one release criterion contained in the release dataset in each case matches a corresponding release criterion stored in the local data receiving unit.

The invention further relates to a function release device having a central data processing unit, having a computer program for execution on a mobile terminal device and having a local data receiving unit.

Electronic locks, for example, which release access to a controlled spatial area (e.g. building areas, rooms, lockers, interior spaces of vehicles, etc.) are known for the release of use of functions. Said electronic locks are configured for mechanical release following a preceding verification of the access authorization. An individual release dataset can be transmitted wirelessly from a mobile terminal device to the local locking unit for this purpose. The release dataset is encrypted in such a way that it cannot be read during transport to the local locking unit.

The release dataset can be stored permanently and inaccessibly on a transponder card for this purpose.

In the event of a release of use with the aid of a mobile terminal device which is per se insecure, an additional security mechanism which excludes misuse of the release dataset must be provided above and beyond the transmission of the release dataset to a local data receiving unit.

DE 29 01 521 A1 discloses a personal identification system in which a personal identification number is used together with a secret check digit as a first key. A second encryption is composed of a predefined relationship to the first key.

DE 10 2016 002 792 A1 describes a biometric secret formation scheme with improved data protection in order to store personal data in non-trusted computer environments. A counter data generation based on a biometric feature is used for a standard encryption, wherein a secret of an individual is linked to the biometric data of the individual in order to generate a verifiable biometric template for use in the authentication of the identity.

US 2018/0061155 A1 describes a method and a system for access control in which access details of the building are transmitted from a mobile device located close to the building for the first authentication. Following successful first authentication, a request for the biometric identification of a user is transmitted to the mobile device. The biometric data are then transmitted from the mobile device to a central server and are verified in a second authentication process. In the event of a positive check, access to the building is released.

DE 10 2016 117 981 A1 discloses a device and a method for evaluating access information having an evaluation and control unit disposed in a protected manner and a door-unlocking device connected thereto, and also an input device which is connected to the evaluation and control unit. The door-unlocking device is controlled to unlock the access door by means of the encrypted access data supplied via the input device following evaluation and successful checking of said access data for granting access. The encrypted information containing a variable time indication is decrypted and evaluated by the evaluation and control unit for this purpose.

DE 10 2014 105 243 A1 discloses an access control system in which access authorization information is communicated to an access control device. The access authorization information generated with a first key comprises access authorization parameters and first checking information. A check is carried out by means of the second key stored in the access control device to determine whether the communicated first checking information was generated by performing cryptographic operations using the first key of the key pair. The access is granted if the aforementioned checking delivers a positive result and a quantity of the communicated access authorization parameters authorizes access in relation to the reference information valid at the time of checking.

On this basis, the object of the present invention is to provide an improved method for the release of use of functions, and a function release device designed for this purpose, a computer program and a local data receiving unit.

It is proposed that the method for the release of use of functions of at least one local data receiving unit for a user by means of a central data processing unit and the at least one selected local data receiving unit comprises the following steps:

a) generating a release dataset through encryption of at least one release criterion, taking account of at least one individual security feature, by the central data processing unit with a release key known to the central data processing unit and to the selected local data receiving unit and with an individual security feature of the user known to the central data processing unit;

b) transmitting the encrypted release dataset from the central data processing unit to the mobile terminal device;

c) transmitting the release dataset from the mobile terminal device to the selected local data receiving unit together with at least one individual security feature of the user;

d) decrypting the release dataset encrypted with the combination of the release key and the individual security feature in the local data receiving unit;

e) releasing the use of a function in the event of successful verification of the release criterion contained in the decrypted release dataset.

To do this, the local data receiving unit is configured to receive an encrypted release dataset from a user and to release use if at least one release criterion contained in the release dataset in each case matches a corresponding release criterion stored in the local data receiving unit.

The use is released through an interaction of a release key known (only) to the central data processing unit and to a selected local data receiving unit, taking account of at least one individual security feature. This individual security feature is communicated on one path to the central data processing unit and on a different path to a selected data processing unit. This combination of the release key and the individual security feature of the user is used for the encryption of a release dataset in the central data processing unit and likewise for the decryption in the selected data receiving unit. The at least one release criterion contained in the encrypted release dataset can thus be read only if both the individual security feature and the release key which is not transmitted openly to the local data receiving unit are known.

If a user now wishes to obtain, for example with his mobile terminal device, a release of a use of a function which is assigned to a selected local data receiving unit or to a locking group of local data receiving units, the release criterion predefined for the release of use of a selected function is encrypted in the secure area of the central data processing unit by means of the combination of the individual security feature and the secret release key of the local data receiving unit.

A combination of the individual security feature of the user and the release key of the selected data processing unit is used for the encryption. For this purpose, the release key is known to both the central data processing unit and the local data receiving unit, but not to the user. Conversely, the individual security feature of the user is communicated on a first path to the central data processing unit and on a second path to the selected local data receiving unit. If the encrypted release dataset is intercepted by an unauthorized third party, an unauthorized decryption and use is prevented by both the selected data receiving unit to which the release key is known, and by the security feature which is known only to the user. The encrypted release dataset can thus be forwarded from the central data processing unit via an insecure transport path to a local data receiving unit.

Following the reception of the release dataset and at least one individual security feature of the user in the local data receiving unit, said release dataset is decrypted using the combination of the individual security feature and the release key stored in the local receiving data unit. The local locking unit is therefore able to check the access authorization in its secure area on the basis of the release criterion transmitted with the release dataset with a respectively corresponding predefined release criterion and, in the event of a positive verification, is able to release the requested use of a function.

The at least one release criterion can comprise an individual user identifier which restricts the use of the requested function, such as e.g. the access in the case of an electronic lock. This individual user identifier can be stored in a release list of the data receiving unit. The release of use is then performed on the basis of the user identifier with the aid of this list.

The at least one release criterion can comprise time information which restricts the use of the requested function, e.g. the access in the case of an electronic lock, to a predefined time period. The validity period of a release dataset, for example, can thus be restricted. The risk of misuse is thus further reduced. However, the time information can also be a validity period predefined by the central data processing unit in which a user obtains a release of use for a function. A central data processing unit can therefore perform a time-related control of the release of use by means of a time stamp of this type.

The at least one release criterion can comprise location information which restricts the release of use to at least one location area. Access to a spatially limited area, for example, such as e.g. to a hotel room or a safe deposit box, can thus be restricted. This can be, for example, by means of an individual number or a range of numbers of local locking units (locking group) for which the user obtains an access authorization by means of the release dataset. Thus, for example, in the case of the verification of a release of access by a local locking unit, a check can be carried out by said locking unit to determine whether the location information matches the location information which is assigned to the local locking unit, such as, for example, an individual identifier of the local locking unit. For this purpose, the local data receiving unit is preferably a part of a locking group, wherein the location information contains at least one identifier for the local locking unit assigned to the locking group.

The release of use can be further secured against misuse if the at least one release feature contained in the encrypted release dataset comprises an individual security feature of the user and the release of the use of a function in step e) is performed only if the individual security feature contained in the release dataset matches the individual security feature transmitted by the user in step c). The individual security feature of the user agreed between the user and the central data processing unit is incorporated by the central data processing unit with the release key into the release dataset during the encryption. For the release of use, this individual security feature must be transmitted by the requesting user to the local data receiving unit, where it is used not only for the decryption, but also for the verification of the individual release criterion contained in the decrypted release dataset. If the release dataset has now been manipulated or hacked, the content can be used only if the individual security feature contained in the release dataset matches the individual security feature transmitted by the user to the local data receiving unit.

The individual security feature can be a personal identification number (PIN) which, on the one hand, is matched by the user with the central data processing unit on an individual case basis or in a general manner, and, on the other hand, is transmitted to the local data receiving unit for the release of use. To do this, an input keypad can be present in the spatial area of the local data receiving unit in order to enter the personal identification number by means of a keypad panel. However, it is also conceivable for the personal identification number to be entered into a mobile terminal device of the user and to be transmitted wirelessly to the local data receiving unit located nearby. However, it is also conceivable for the individual security feature to be a biometric code, such as for example, a papillary pattern of the fingers (minutiae) or the iris or retina structure of the user. The risk of misuse of the individual security feature which is physically tied to the user by means of the biometric code can thus be further reduced. The individual security feature can be stored for the individual authorized users in the secure area of the central data processing unit. It is then possible for the user only to achieve a release of use only with his user-individual and therefore unique security feature. However this is not sufficient, since the release key known only to the central data processing unit and to the requested local data receiving unit is also additionally required.

An authentication with a plurality of factors is therefore possible in an easily manageable manner.

An individual security feature can be an identification number of the mobile terminal device (IMEI) of the user, an identification number (IMSI) of the subscriber identity module (SIM) of the mobile terminal device of the user, the telephone number of the mobile terminal device of the user, the UID number of the subscriber identity module (SIM) of the user, the integrated SIM card identifier (ICC-ID) of the subscriber identity module (SIM) of the user, an identifier of a computer program running on the mobile terminal device (IdentifierForVendor) for the execution of step d) or an instance identifier (Instance ID). Other available individual identifiers of the mobile terminal device are correspondingly also conceivable. Biunique identifiers of the mobile terminal device of a user can thus be advantageously used as an individual security feature which is used to identify the authorized user.

The security feature can be transmitted from the mobile terminal device to the local data receiving unit by means of encryption using a transport key. This key can be generated in the central data processing unit. The transport key can be transmitted encrypted with the release key and simultaneously unencrypted to the mobile terminal device. The individual security feature is then encrypted with the unencrypted transport key and is transmitted to the local data receiving unit. The local receiving unit can then use the transport key from the encrypted release dataset after the release dataset has been decrypted using the release key in order to decrypt the at least one individual security feature and then verify the release dataset.

The release dataset can be transmitted directly to the selected local data receiving unit. However, this can also be done indirectly, e.g. by storing the release dataset on a near-field transmission unit. The near-field transmission unit can be a mobile terminal device, such as e.g. a smartphone, having a software application configured to carry out the method. However, it can also be a transponder card which is read wirelessly by a near-field reading device of the local data receiving unit. A transfer of rights can therefore be performed not only to a mobile terminal device of the user, but also to a transponder card or similar, which is then more easily manageable.

During the verification, not only the release dataset transmitted from the central data processing unit, e.g. via a mobile terminal device, to the local data receiving unit can be verified. It is conceivable to additionally verify the individual identifier of the mobile terminal device also which, in the event of a request for release of access, was first transmitted from the mobile terminal device to the central data processing unit and was then forwarded to the local data receiving unit. Misuse of the release dataset by a third party is thus more reliably prevented. A prerequisite for a release of use is namely that the release dataset has been sent in advance to the local data receiving unit together with the individual identifier of the mobile terminal device which has also been used for the request of the release dataset from the mobile terminal device to the central data processing unit. Misuse can easily be reliably excluded by additionally using an individual identifier also which is linked to a mobile terminal device for the release verification.

After a release dataset has instigated a release of use in the local data receiving unit, it is advantageous to transmit this event in a response dataset via the mobile terminal device to the central data processing unit and to store it there. It is therefore possible to verify whether a release of use has also really been successful. On the opposite transport path which uses the same encryption mechanism as the path from the central data processing unit to the local data receiving unit, further status information, such as errors in the use of the release dataset, can also be transmitted in the response dataset and can be stored for subsequent error correction in the data processing unit.

The invention is explained in detail below with reference to the attached drawings. In the drawings.

Figure 1:
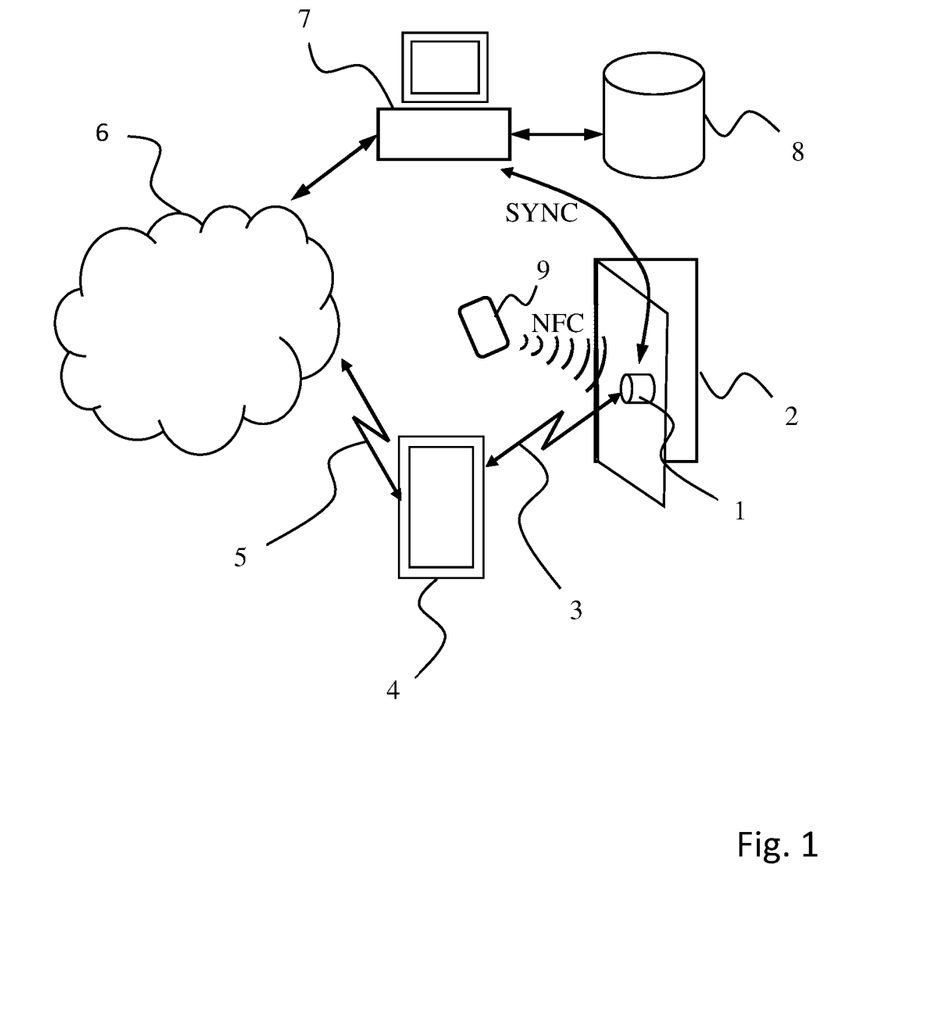
FIG. 1—shows an outline of a function release device in the form of an access control device.

FIG. 1 shows an outline of a function release device in the form of an access control device which has a local data receiving unit 1 on a door 2. In the example embodiment, the local data receiving unit 1 has a locking unit with a lock to lock and unlock the door 2. This can be a door 2 for a room in a building. However, it can also be a door of a locker or other secured spatial area. However, it is also conceivable for the local data receiving unit 1 to have an electronic release of use unit for release of use, such as, for example, for electronic devices or electromechanical devices and the like.

For the release of use of a function, a release dataset can be sent via a wireless communication channel 3 from a mobile terminal device 4 to the local locking unit 1. The local data receiving unit 1 is configured, for example, by means of a suitably programmable computing unit to decrypt the release dataset using the release key, taking account of at least one security feature, and to compare the at least one release criterion contained in the release dataset with a predefined release criterion and, depending on the success of this verification, to release the requested use of a function, such as e.g. the access by opening an electromechanical lock.

However, this takes place only if the release key with which the release dataset has been encrypted also matches the release key used by the local data receiving unit 1.

The release dataset transmitted from the mobile terminal device 4 of a user to the local data receiving unit 1 for the release of use of a function and containing the at least one release criterion is present in an encrypted format which cannot be decrypted by the mobile terminal device 4 and unauthorized third parties themselves. This release dataset has also not been generated by the mobile terminal device 4. Instead, the release of use of a function initially requires a request for the security feature to release the desired function which is assigned to a selected local data receiving unit from the mobile terminal device 4 via a data radio channel 5 and a data transmission network 6 to a central data processing unit 7. Said data processing unit is designed to control the release of use through suitable programming and is connected to a secure data memory 8 in which the usage authorizations of different users for specific functions of local data receiving units 1 are predefined.

A release dataset is transmitted from the central data processing unit 7 to the mobile terminal device 4 for the release of use of a function. An individual security feature of the user is further agreed or communicated between the user and the central data processing unit. This can be done before a specific release request, e.g. during the registration of a user profile. However, it is also conceivable for the user to transmit at least one individual security feature together with the release request to the central data processing unit 7. A combination of a general individual security feature which has been agreed in advance and a current individual security feature which is agreed for a respective release of use of a function is also conceivable.

The release key is present in secured form in the central data processing unit 7 and in the respective local data receiving unit 1. It is known to these two units only and is exchanged once on a secured communication path SYNC. The release key can be updated subsequently if necessary.

A list of release keys for functions which are assigned in each case to at least one data receiving unit 1 is thus stored in the secure data memory 8.

For rights management, usage rights for selected functions are assigned to user by a computer program running on the central data processing unit 7 and accessing the data stored in the secure data memory 8. For this purpose, at least one release criterion is generated which can be read by a local data receiving unit 1 and can be used as a criterion for the release of use of a function assigned to the local data receiving unit 1. A release criterion of this type can contain time information by means of which the release of use of a function is restricted to the time defined therewith (e.g. start time or stop time) or a time period. A release criterion of this type can contain location information, such as e.g. the identifier of the local data receiving unit 1, in order to limit the use of a function therewith to a spatially restricted location area.

This at least one release criterion is then packed into at least one release dataset and is protected there against unauthorized use with a release key, taking account of the security feature. The release dataset can thus be transmitted securely as a transport packet from the central data processing unit 7. After the release dataset encrypted with the release key has been received in the mobile terminal device 4 of the user, the release dataset is transmitted unchanged from the mobile terminal device 4 via the wireless communication connection to the selected local data receiving unit 1. The at least one individual security feature is further transmitted by the user or his mobile terminal device 4 to the local data receiving unit 1.

Prior to its transmission, the security feature can be encrypted with a transport key known to the mobile terminal device 4 and to the local data receiving unit 1. This transport key can be generated in the central data processing unit 7 and can be transmitted to the mobile terminal device 4. The transport key is transmitted encrypted with the release key and unencrypted. The mobile terminal device 4 encrypts the at least one security feature using the unencrypted transport key and transmits the encrypted security feature to the local data receiving unit 1 together with the encrypted transport key. The local data receiving unit 1 decrypts the transport key by means of the release key and then uses the decrypted transport key to decrypt the at least one security feature.

The local data receiving unit 1 is now able to decrypt the release dataset with the release key securely stored there and with the at least one individual security feature received in connection with the release request, verify it and read the at least one release criterion contained therein. This at least one release criterion can then be compared with respective corresponding release criteria in the local data receiving unit 1 in order to release the requested function in the event of a successful verification. A correspondence, for example, of the current time with release time information and/or the correspondence of location information with the spatial location of the local data receiving unit 1 can be evaluated for this purpose.

It is furthermore apparent that the local data receiving unit 1 can optionally be additionally controlled wirelessly in a known manner with an intrinsically secure transponder card 9 for the release. The security feature stored there is intrinsically secure, since it is stored in a secure area of the transponder card 9 and is dedicated to the transponder card 9. The transponder card 9 transmits the data stored there via RFID or NFC to the local data receiving unit.

Using the mobile terminal device 4, an additional channel is provided in order to control the local data receiving unit 1 above and beyond, for example, the RFID communication by means of a transponder card 9.

The wireless communication channel 3 can similarly support near-field communication NFC. Alternatively or additionally thereto, a short-range data transmission is conceivable, e.g. according to the BLE standard (Bluetooth Low Energy standard), WLAN standard (Wireless Local Area Network standard), 5G standard and the like.

Figure 2:
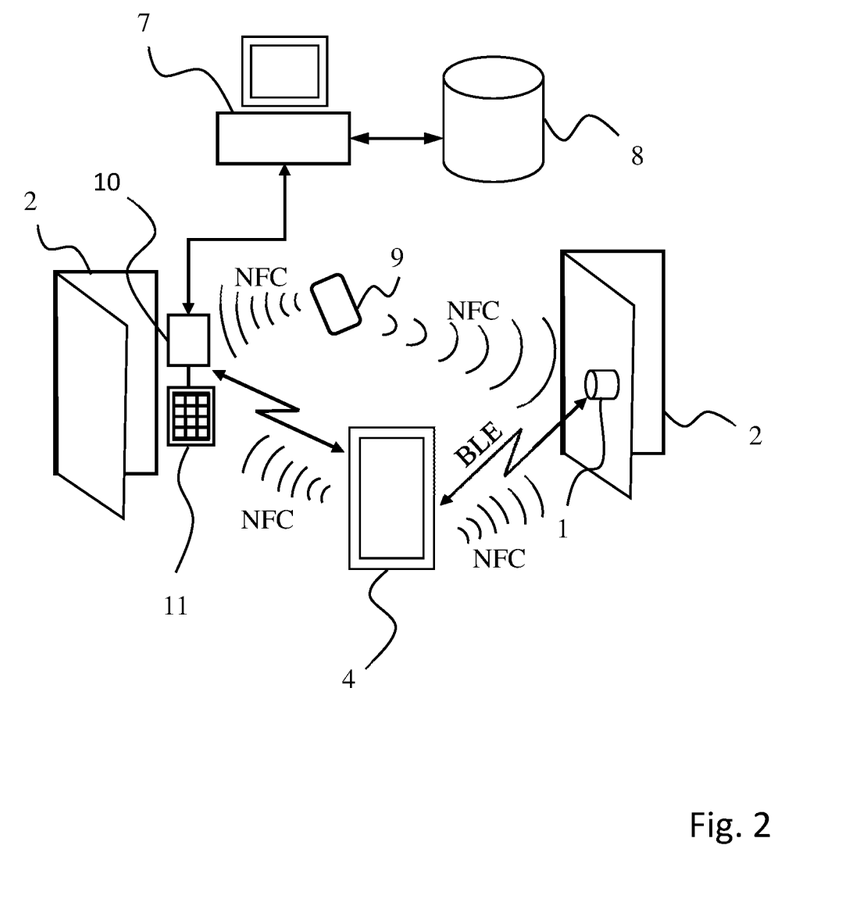
FIG. 2—shows an outline of an extended embodiment of the function release device.

FIG. 2 shows an outline of an extended embodiment of the function release device from FIG. 1. A near-field data transmission unit 10 is connected there to the central data processing unit 7 and has a communication connection on the one hand to a transponder 9 and to the mobile terminal device 4. The near-field data transmission unit 10 is configured to update the transponder 9.

The transponder 9 stores the encrypted release dataset from the central data processing unit 7 and then transmits it via RFID or NFC to the local data receiving unit 1.

Alternatively, a release criteria can be requested by a mobile terminal device 4 of a user from the central data processing unit 7 for the release of use of functions. Said release criterion is then transmitted in the previously described encrypted manner as the release dataset via the near-field data transmission unit 10 and to the mobile terminal device 4.

The transponder 9 can be updated on the near-field data transmission unit 10 if the user brings the transponder card 9 into the short-range area of the near-field data transmission unit 10. The wireless communication can take place according to an NFC standard for this purpose. In the updating process, the release dataset and/or the validity period of the transponder 9 can be transmitted encrypted.

Then, in the case of a door-locking function, not only the door 2 secured with the near-field data transmission unit 10 can be opened by means of the transponder card 9 of the mobile terminal device 4, but also other further doors 2 not connected online to the data processing unit 7. These doors can then be opened by means of a transmission of release datasets from the transponder card 9 or from the mobile terminal device 4 to other local data receiving units 1 which have no online communication connection to the near-field data transmission unit 10 or to the central data processing unit 7.

A reading device 11 can be connected to the near-field data transmission unit 10 or to a local data receiving unit 1 for the input and transmission of an individual security feature. The user can perform the input or capture of an individual security feature via the reading device 11.

A personal identification number (PIN), for example, which can be entered via a keypad of the reading device 11 is suitable as an individual security feature. The input via the reading device can be used to transmit the personal identification number (PIN) together with a release request to the central data processing unit 7. However, it can also be used later, after a release dataset has been received from the central data processing unit 7 and has been transmitted to a selected local data receiving unit 1, to capture the personal identification number (PIN) and transmit it to the selected local data receiving unit 1.

A biometric code of a user is also suitable as an individual security feature. The biometric code is captured e.g. with the reading unit 11 and is transmitted in a first step to the central data processing unit 7 for the release of the use of a function. In a second step, in the case of a specific release request for the use of a function, the biometric code is captured once more with the reading unit 11 and is transmitted to the local data receiving unit 1.

The reading unit 11 can therefore have, for example, an input keypad and/or a scanning unit for biometric features. A fingerprint sensor, for example, for recording the papillary pattern of the fingers in order to use the minutiae therefrom for the formation of the transport key is suitable for this purpose. However, a use of data representing the iris and retina structure of the user, data characterizing the face of the user or the like is also conceivable.

Figure 3:
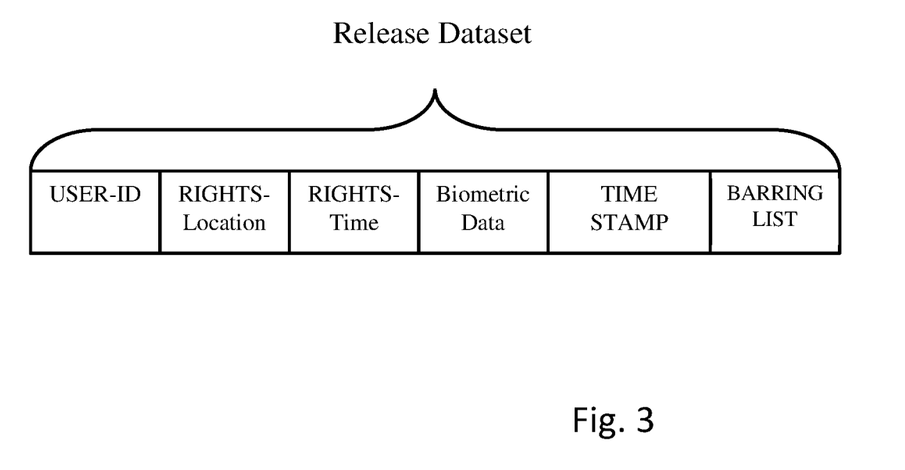
FIG. 3—shows an example of a data structure of a release dataset with encrypted release criteria contained therein for the release of use for a function.

FIG. 3 shows an outline of an example of the data structure of a release dataset with the encrypted data criteria contained therein for the release of use for a function. This release dataset is encrypted using a release key. At least one security feature is also incorporated into the encryption without itself being a component of the release dataset. For example, a user identification number (USER-ID), location rights (RIGHTS-location) with a definition of location areas permitted for the use of the function, time rights (RIGHTS-time) for limiting the use of a function to specific times or time ranges, or biometric data for verification thereof can be stored as release criteria.

The validity period of the release dataset can be limited by means of a similarly optional time stamp. The risk of misuse can therefore be further reduced since all rights in the release dataset expire at the end of the chosen validity period until a new validity period is conferred by the central data processing unit.

In addition, a barring list can be included which contains a list of access-barred users. The barring list in the dataset enables the local locking units 1 to be updated accordingly over time through the transmission of the dataset to the local locking units 1.

This release dataset or the data contained therein is/are encrypted through the combination of at least one individual security feature and a release key which is stored securely in the central data processing unit 7 and in the local locking units 1, and, if necessary, further data. Here, the release key is an individual key of the assigned local data receiving unit 1 or a function assigned to the local data receiving unit 1.

A plurality of release datasets of this type can be transmitted together in a packet or bunch. Each release dataset can in each case be provided for, and can be decrypted only by, an assigned local data receiving unit 1. The release datasets can have corresponding address identifiers in an open header with which the local data receiving units 1 can recognize whether a release dataset is intended for it. It is also conceivable for a plurality of release datasets of a bunch to be intended for the same local data receiving unit 1, but to contain different data for the release of different functions.

In the case where a release dataset or the transport packet has been intercepted during the transport from the central data processing unit 7, it can be misused only if, during the transmission of the dataset to the local locking unit 1, the at least one individual security feature that is used is also known and is transmitted with the release request to the selected local data receiving unit 1. Only then is the local data receiving unit 1 able to decrypt the release dataset and to read the at least one release criterion contained therein and verify it for the release of use of a function. A further prerequisite is that the intercepted release dataset is also transmitted to the correctly assigned local data receiving unit 1, since only the latter has the individual release key of this local data receiving unit.

Even if the mobile terminal device 4 and the transport path are not secure, the release dataset which has been encrypted using a combination of the individual security feature of the user and the individual release key of the local data receiving unit 1 can no longer be misused.

The central data processing unit 7 (cloud) can additionally receive an individual identifier of the mobile terminal device 4 also, such as, for example, an identification number of the mobile terminal device (IMEI) of the user, an identification number (IMSI) of the subscriber identity module (SIM) of the mobile terminal device 4 of the user, the telephone number of the mobile terminal device 4 of the user, the UID number of the subscriber identity module (SIM) of the user, the integrated SIM card identifier (ICC-ID) of the subscriber identity module (SIM) of the user, an identifier of a computer program running on the mobile terminal device 4 (IdentifierForVendor) for the execution of step d) or an instance identifier (Instance ID). These data can also be used as a security feature.

In connection with the transmission of a release dataset from a mobile terminal device 4 to a local data receiving unit 1, this information of the requesting mobile terminal device 4 can also be transmitted. The function release can therefore be controlled in such a way that a release takes place only if the mobile terminal device 4 requesting the function release from the central data processing unit 7 is identical to the mobile terminal device 4 requesting the function release from the local data receiving unit 1. The identity is established by means of the aforementioned security features which relate to biunique identifiers of the mobile terminal device 4 or of a computer program installed there.

Figure 4:
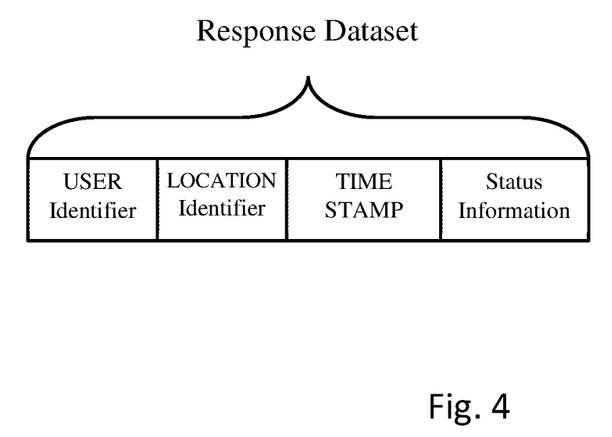
FIG. 4—shows an example of a data structure of a response dataset with information contained therein.

FIG. 4 shows an outline of an example of the data structure of a response dataset with the information contained therein. This response dataset can be encrypted with a key known to the local data receiving unit 1 and to the central data processing unit 7, such as, for example, the release key. The response dataset can contain an identifier of the user, such as, for example, a user ID and/or an identifier of the local data receiving unit and/or a time stamp and/or status information. Status information can, for example, be information such as a low battery state, a blocked door, access granted and/or access refused.

This status information is transmitted to the central data processing unit 7 and is stored there as confirmation of the execution of the release dataset.

The invention claimed is:

1. A method for the release of use of functions of at least one local data receiving unit for a user by a central data processing unit and the at least one selected local data receiving unit, wherein the at least one local data receiving unit is configured to receive an encrypted release dataset from a user and to release use if at least one release criterion contained in the release dataset in each case matches a corresponding release criterion stored in the at least one local data receiving unit, comprising:

a) generating the encrypted release dataset through encryption of the at least one release criterion by the central data processing unit with a release key known to the central data processing unit and to the at least one local data receiving unit and with an individual security feature of the user known to the central data processing unit;

b) transmitting the encrypted release dataset from the central data processing unit to a mobile terminal device;

c) transmitting the encrypted release dataset from the mobile terminal device and, separate to the transmitting of the encrypted release dataset, transmitting the individual security feature of the user to a selected local data receiving unit;

d) decrypting the release dataset which is encrypted with the combination of the release key stored in a secured manner in the local data receiving unit and the individual security feature, which is separately received by the selected local data receiving unit, in the selected local data receiving unit to produce a decrypted release dataset; and e) releasing the use of a function on successful verification of the release criterion contained in the decrypted release dataset, wherein at least one release criterion comprises the individual security feature of the user and the release of the use of a function in step e) is performed only if the individual security feature contained in the release dataset matches the individual security feature transmitted by the user in step c).

2. The method according to claim 1, wherein the individual security feature is transmitted in step c) independently from the transmission of the release dataset.

3. The method according to claim 1 further comprising, following the successful decryption of the release dataset, matching of the at least one release criterion contained in the release dataset is performed, wherein said matching, in the event of a successful verification, results in the release of the use of the function.

4. The method according to claim 1 wherein the at least one release criterion comprises time information which restricts the release of use of the function to a predefined time period.

5. The method according to claim 1 wherein the at least one release criterion comprises location information which restricts the release of the function to at least one location area.

6. The method according to claim 1 wherein the at least one local data receiving unit is a part of a locking group and location information for the at least one local data receiving unit contains at least one identifier for a local locking unit assigned to the locking group.

7. The method according to claim 1 wherein the individual security feature is a personal identification number (PIN) or a biometric code.

8. The method according to claim 1 wherein the transmission of the at least one individual security feature from the mobile terminal device to the at least one local data receiving unit is encrypted by a transport key known to the mobile terminal device and to the at least one local data receiving unit.

9. The method according to claim 8 wherein the transport key is encrypted in the release dataset together with the at least one release criterion and transmitted in said encrypted form to the mobile terminal device in step a) and wherein the transport key is additionally transmitted in unencrypted form to the mobile terminal device in step b).

10. The method according claim 1 wherein the individual security feature is an identification number of the mobile terminal device of the user, an identification number of the Subscriber Identity Module (SIM) of the mobile terminal device of the user, the telephone number of the mobile terminal device of the user, the Unique Identifier (UID) number of the Subscriber Identity Module (SIM) of the user, the integrated SIM card identifier (ICC-ID) of the Subscriber Identity Module (SIM) of the user, an identifier of a computer program running on the mobile terminal device for the execution of step d) or an instance identifier.

11. The method according to claim 1 wherein at least one response dataset is generated by the at least one local data receiving unit in response to the decrypted release dataset received from the mobile terminal in encrypted form and is transmitted via the mobile terminal device to the central data processing unit.

12. The method according to claim 11, wherein the response dataset is encrypted with a key known to the at least one local data receiving unit and to the central data processing unit.

13. The method according to claim 11 wherein the response dataset contains an identifier of the user and/or an identifier of the at least one local data receiving unit and/or a time stamp and/or status information.

14. The method according to claim 11 wherein the encrypted release dataset is transmitted to the at least one local data receiving unit through storage of the encrypted release dataset on a mobile terminal device by a near-field data transmission unit.

15. The method according to claim 11, wherein the mobile terminal device is a transponder card.

16. A function release device, comprising:
a central data processing unit;
a computer program for execution on a mobile terminal device; and
a local data receiving unit, wherein the function release device is designed to carry out the method for the release of use of functions of at least one local data receiving unit for a user by a central data processing unit and the at least one selected local data receiving unit, wherein the at least one local data receiving unit is configured to receive an encrypted release dataset from a user and to release use if at least one release criterion contained in the release dataset in each case matches a corresponding release criterion stored in the at least one local data receiving unit, comprising:
a) generating the encrypted release dataset through encryption of the at least one release criterion by the central data processing unit with a release key known to the central data processing unit and to the at least one local data receiving unit and with an individual security feature of the user known to the central data processing unit;
b) transmitting the encrypted release dataset from the central data processing unit to a mobile terminal device;
c) transmitting the release dataset from the mobile terminal device to the at least one local data receiving unit, and, separate to the transmitting of the encrypted release dataset, transmitting the individual security feature of the user;
d) decrypting the release dataset which is encrypted with the combination of the release key stored in a secured manner in the local data receiving unit and the individual security feature of the user received from the user in the at least one local data receiving unit to produce a decrypted release dataset; and
e) releasing the use of a function on successful verification of the release criterion contained in the decrypted release dataset,
wherein at least one release criterion comprises the individual security feature of the user and the release of the use of a function in step e) is performed only if the individual security feature contained in the release dataset matches the individual security feature transmitted by the user in step c).

17. A local data receiving unit, comprising:
a radio receiving unit,
a data memory,
a processor, and
a mechanical locking and unlocking unit,
wherein the local data receiving unit is configured for receiving an encrypted release dataset from a mobile terminal device and, separate to the receiving of the encrypted release dataset, receiving at least one individual security feature of the user;

decrypting the release dataset encrypted with a combination of the release key stored in a secured manner in the selected local data receiving unit and the received at least one individual security feature in the selected local data receiving unit;

verifying a match of the at least one release criterion contained in the release dataset with a respective corresponding release criterion; and releasing the use of a function in the event of successful verification, wherein at least one release criterion comprises the individual security feature of the user and the release of the use of a function is performed only if the individual security feature contained in the release dataset matches the individual security feature received from the user.

18. The local data receiving unit according to claim 17, wherein local data receiving unit is connected to an identification-capturing unit configured to capture an individual security feature of the user.

19. The local data receiving unit according to claim 18, wherein the identification-capturing unit comprises a fingerprint sensor, a keypad panel for an input of a personal identification code, or an iris sensor.

20. The local data receiving unit according to claim 17 wherein the local receiving unit is configured as a part of a locking unit.

* * * * *